(12) United States Patent
Sivinski

(10) Patent No.: US 10,512,211 B2
(45) Date of Patent: Dec. 24, 2019

(54) AGRICULTURAL ROW PLANTER MOUNTING BRACKET

(71) Applicant: Harvest International, Inc., Storm Lake, IA (US)

(72) Inventor: Jeffrey Alan Sivinski, Cherokee, IA (US)

(73) Assignee: Harvest International, Inc., Storm Lake, IA (US)

( * ) Notice: Subject to any disclaimer, the term of this patent is extended or adjusted under 35 U.S.C. 154(b) by 77 days.

(21) Appl. No.: 15/688,299

(22) Filed: Aug. 28, 2017

(65) Prior Publication Data

US 2019/0059208 A1    Feb. 28, 2019

(51) Int. Cl.
| A01C 7/20 | (2006.01) |
| A01B 49/02 | (2006.01) |
| A01C 5/06 | (2006.01) |
| A01B 49/04 | (2006.01) |
| A01B 5/04 | (2006.01) |

(52) U.S. Cl.
CPC ............ *A01C 7/201* (2013.01); *A01B 49/027* (2013.01); *A01C 5/064* (2013.01); *A01B 5/04* (2013.01); *A01B 49/04* (2013.01)

(58) Field of Classification Search
CPC .. A01C 7/201; A01C 7/20; A01C 7/00; A01C 5/064; A01C 5/062; A01C 5/06; A01C 5/00; A01B 49/037; A01B 49/00; A01B 49/02; A01B 5/04; A01B 5/00; A01B 49/04

See application file for complete search history.

(56) References Cited

U.S. PATENT DOCUMENTS

| 2,318,205 | A | 5/1943 | Drennan |
| 3,398,983 | A | 8/1968 | Olsson |
| 4,905,770 | A | 3/1990 | Hanig |
| 6,119,608 | A | 9/2000 | Peterson et al. |
| 7,401,561 | B1 | 7/2008 | Kurz |
| 8,863,857 | B2 | 10/2014 | Bassett |
| 9,345,187 | B2 | 5/2016 | Laake, Jr. et al. |
| 2005/0072344 | A1 | 4/2005 | Kester |
| 2012/0210920 | A1 | 8/2012 | Bassett |

FOREIGN PATENT DOCUMENTS

| CA | 1201002 A | 2/1986 |
| CN | 206423093 U | 8/2017 |
| DE | 3025020 A1 | 4/1982 |
| DE | 29810404 U1 | 12/1998 |

(Continued)

OTHER PUBLICATIONS

Derwent—Acc-No. 2017-5916Q, Dun G et al., Aug. 22, 2017, Univ Northeast Forestry[UNDB], Derwent—Week: 201760 (Year: 2017).*

*Primary Examiner* — Christopher J. Novosad
(74) *Attorney, Agent, or Firm* — McKee, Voorhees & Sease, PLC

(57) ABSTRACT

A bracket assembly for row unit planters to withstand draft forces created by high speed and no tillage planting. The upper and lower link arms of the bracket assembly are pivotally connected to the front and rear mounting plates using full-length crossed shafts or shortened stub spindles. Tapered bearing races and tapered bushings are utilized at each end of the link arms to minimize wear and maintenance.

14 Claims, 13 Drawing Sheets

(56) References Cited

FOREIGN PATENT DOCUMENTS

| EP | 0155654 A2 | 9/1985 |
| EP | 2965603 A1 | 1/2016 |
| FR | 1578709 | 3/1967 |
| GB | 2030036 A | 4/1980 |
| WO | 2017155954 A1 | 9/2017 |

\* cited by examiner

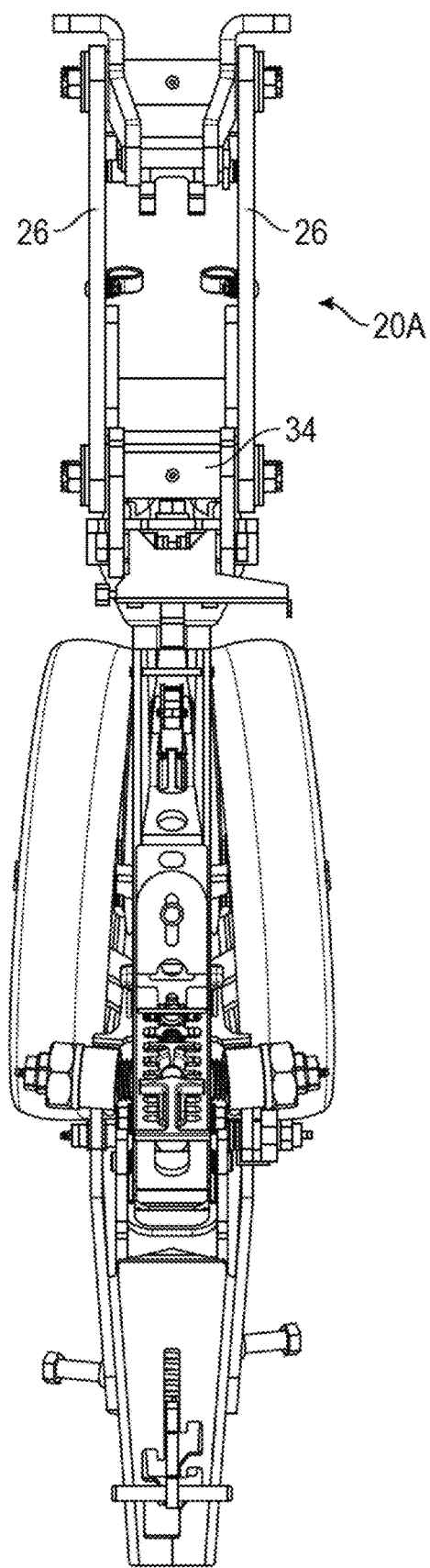
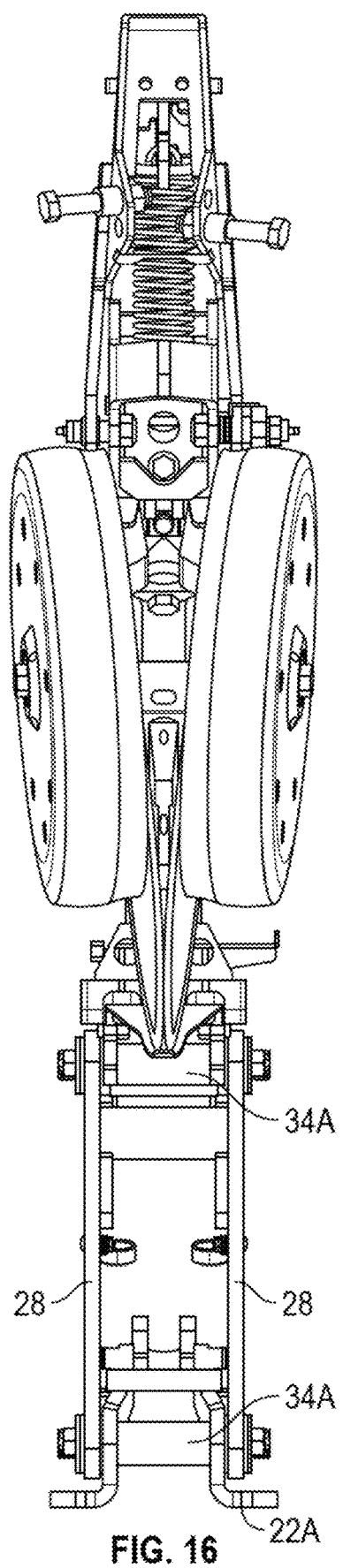
FIG. 15
FIG. 16

AGRICULTURAL ROW PLANTER MOUNTING BRACKET

FIELD OF THE INVENTION

The invention is directed towards agricultural row planter units, and particularly to improved mounting brackets which can withstand higher drag loads resulting from increased planting speeds and crop residue present in no-till planting.

BACKGROUND OF THE INVENTION

As technology has become more important in farming operations, such as precision farming, seed planting has become more accurate. Improved technology has also allowed increased planting speeds. No-till planting has also become commonplace, which plants seeds in fields with crop residue from the previous season.

Conventional seed crop planting utilizes a toolbar with a plurality of seed hoppers mounted on row planter units, with each unit including opening discs, gauge wheels, and closing wheels mounted to the toolbar via a bracket assembly. In agriculture, draft is the force required to move the implement through the soil in the direction of travel. The draft load or force on the implement is a function of the soil resistance, which depends upon various factors. For example, fine soil increases draft as compared to coarse soil. Inclines in the field also increase draft force, as does crop residue in the field. Increased soil moisture further increases the draft load. Also, the draft load increases as the planting speed increases and as the planting depth increases.

With increased plating speeds and no till plating, row units are subjected to additional draft stress during the planting operation. This increased stress has led to the failure of bolts in the bracket assembly. Thus, there is a need for an improved design of the row unit mounting plates and link arms, and the pivotal connections therebetween, to endure the higher draft loads without breakage and while minimizing maintenance.

Accordingly, a primary objective of the present invention is the provision of an improved bracket assembly for row planter units which can withstand higher drafting forces which arise from high-speed planting and/or no till planting.

A further objective of the present invention is the provision of a row planter bracket assembly having robust pivot connections between the mounting plates and the link arms.

Another objective of the present invention is the provision of a bracket assembly for row planter units having stronger pivot connections for the link arms so as to withstand the draft forces of high-speed and no till planting operations.

Still another objective of the present invention is the provision of heavy duty pivot connections for row planter bracket assemblies which can be original equipment on new brackets or retrofit on existing brackets.

Yet another objective of the present invention is the provision of a row planter bracket assembly having components which are durable in use and resistant to failure.

Another objective of the present invention is provision of a row planter bracket assembly which is economical to manufacture, versatile in use, and requires minimal and simple maintenance.

These and other objectives will become apparent from the following description of the invention.

SUMMARY OF THE INVENTION

A bracket assembly is provided for a row planter unit, and comprises a front mounting plate, a rear mounting plate, and upper and lower link arms on the left and right sides of the mounting plates. The mounting plates and link arms define 8 corners for the bracket assembly. The link arms are pivotally connected to the mounting plates at each corner by increased diameter shafts or spindles. For example, a 1-inch diameter cross shaft can extend through the left and right link arms at the upper and/or lower, front and/or rear corners of the assembly. The length of the cross shaft corresponds to the width of the mounting plates, so as to accommodate wide or narrow bracket assemblies. As an alternative to the full width cross shafts, or in combination with the cross shafts, shorter 1-inch diameter stub spindles can be used at the corners of the bracket assembly. A tapered composite bearing is provided in the end of each link arm at each corner, with the cross shaft and stub spindles having a flat surface matingly engaged by a flat surface on the tapered bearing so as to prevent rotation of the bearing. The cross shafts and stub spindles replace the conventional ⅝" bolts used to mount the link arms to the front and rear mounting plates. The cross shaft and stub spindles have ends with external threads to receive a castle nut. The cross shaft and stub spindles extend through bushings welded to the front and rear mounting plates, and are pinned to the bushings to prevent rotation of the cross shaft and stub spindles.

During the planting operation, the row planter bracket assembly with the heavy-duty pivot shafts or spindles can withstand heavy draft loads without breakage or failure, thus minimizing maintenance and repair of the bracket assemblies.

BRIEF DESCRIPTION OF THE DRAWINGS

FIGS. 11-17 show an alternative embodiment of a narrow bracket assembly, according to the present invention.

FIG. 1 is a perspective view of the bracket assembly according to the first embodiment.

FIG. 2 is another perspective view of the bracket assembly of the first embodiment.

FIG. 3 is a side elevation view of the bracket assembly shown in FIGS. 1 and 2, with the opposite side being a mirror image.

FIG. 4 is a front elevation of the bracket assembly shown in FIGS. 1 and 2.

FIG. 5 is a rear elevation view of the bracket assembly shown in FIGS. 1 and 2.

FIG. 6 is a top plane view of the bracket assembly shown in FIGS. 1 and 2.

FIG. 7 is a bottom plane view of the bracket assembly shown in FIGS. 1 and 2.

FIG. 8 is a partially exploded view of the bracket assembly shown in FIGS. 1 and 2.

FIG. 9 is an enlarged partially exploded view showing a front lower corner of the bracket assembly shown in FIGS. 1 and 2.

FIG. 10 is an enlarged perspective view showing an upper front corner of the bracket assembly shown in FIGS. 1 and 2.

FIG. 11 is a perspective view of the bracket assembly of the second embodiment.

FIG. 12 is a side elevation view of the second embodiment bracket assembly, with the opposite side being a mirror image.

FIG. 13 is a front elevation view of the bracket assembly shown in FIG. 11.

FIG. 14 is a rear elevation view of the bracket assembly shown in FIG. 11.

FIG. 15 is a top plane view of the bracket assembly shown in FIG. 11.

FIG. 16 is a bottom plane view of the bracket assembly shown in FIG. 11.

FIG. 17 is a partially exploded view of the bracket assembly shown in FIG. 11.

DETAILED DESCRIPTION OF THE PREFERRED EMBODIMENTS

Figure 1:
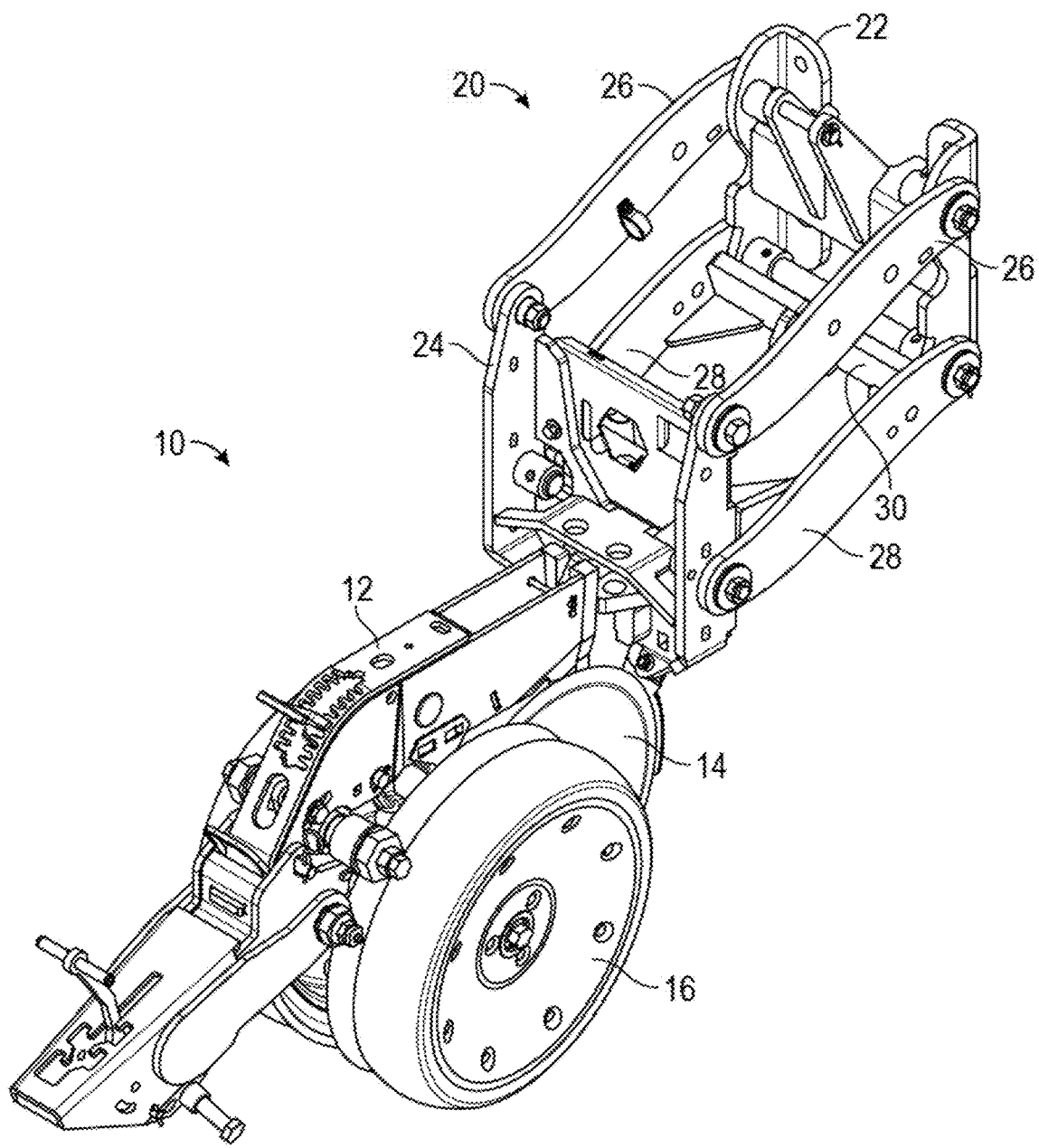
FIGS. 1-10 show a first embodiment of the bracket assembly, according to the present invention.
Figure 2:
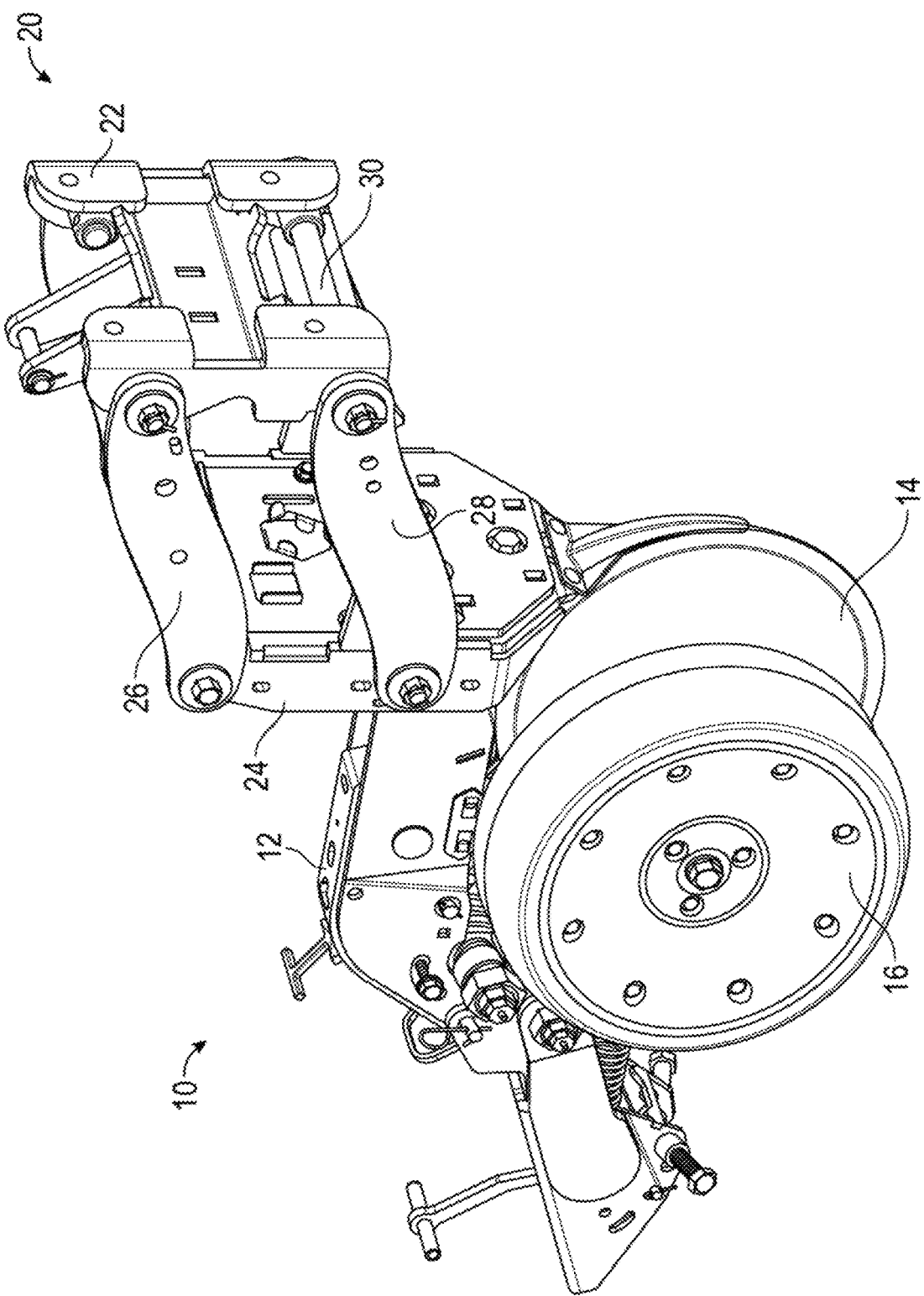
Figure 3:
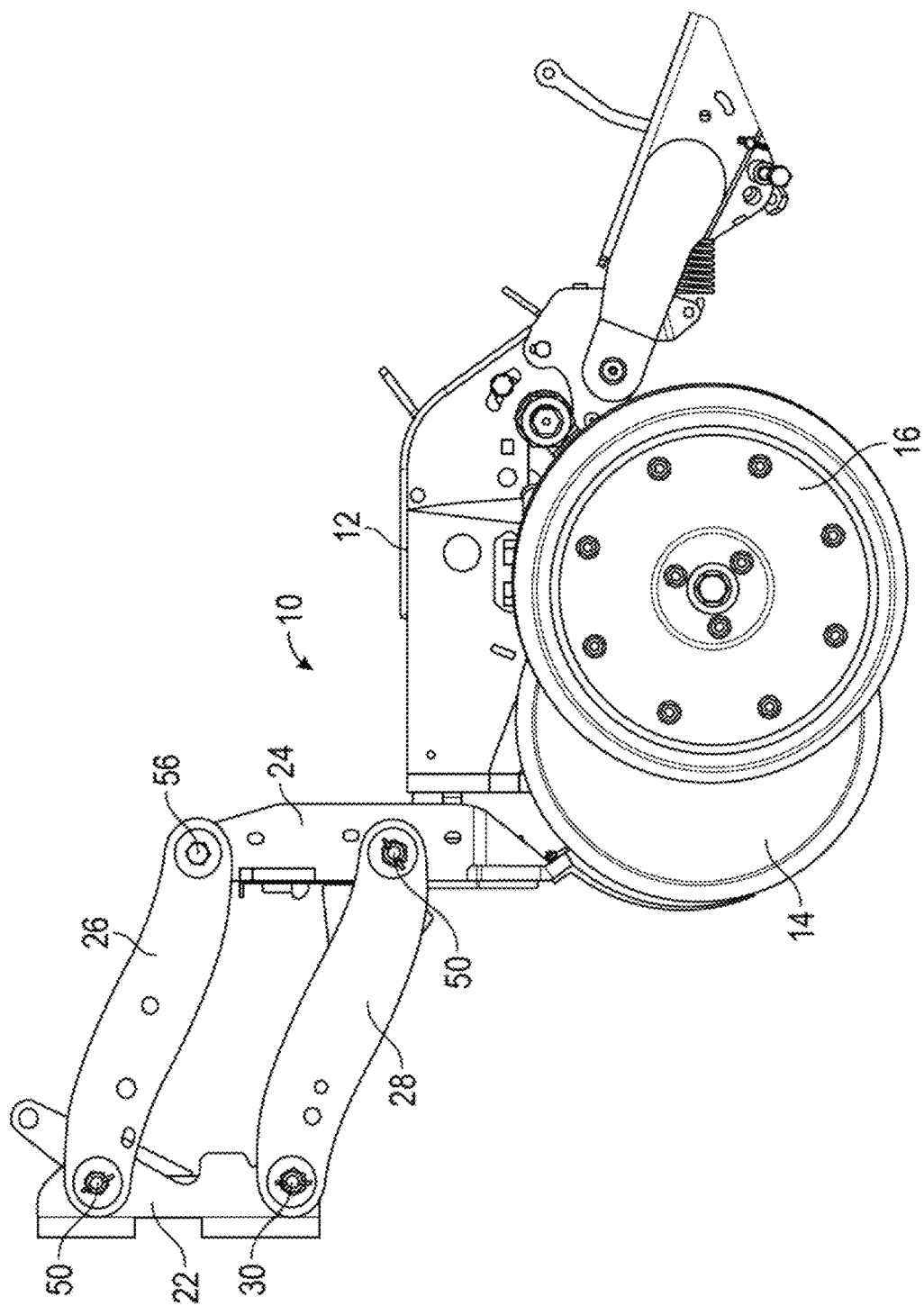
Figure 4:
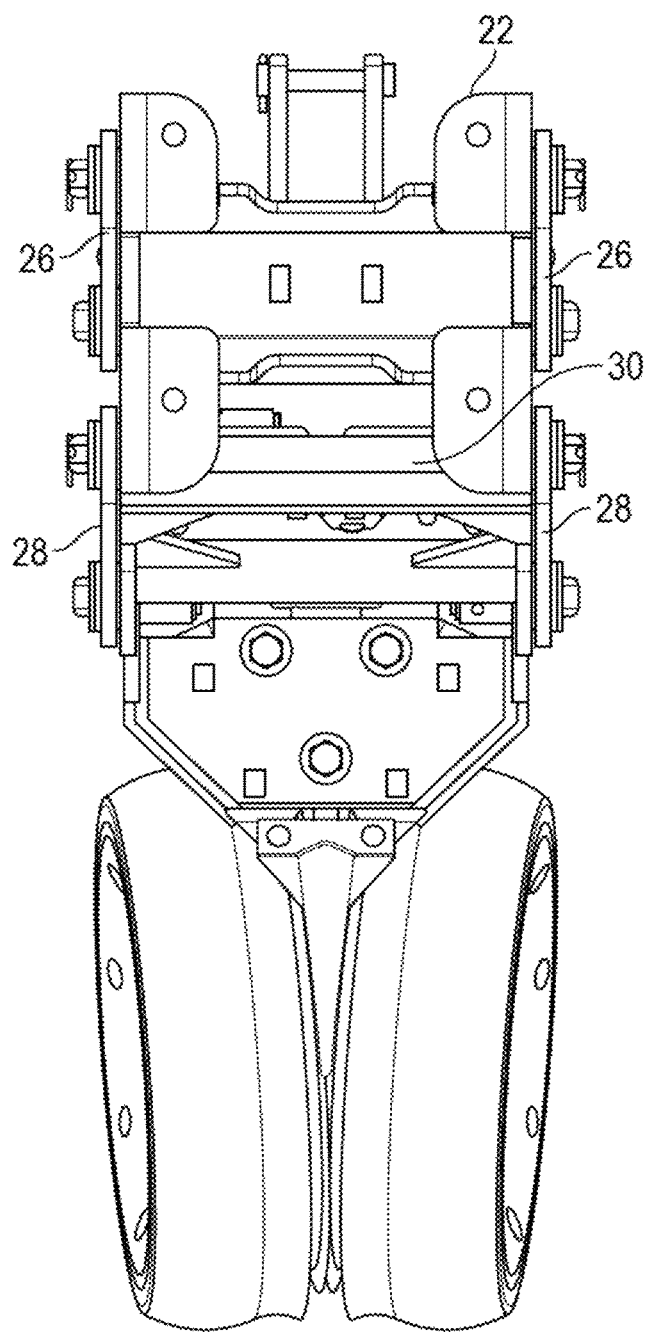
Figure 5:
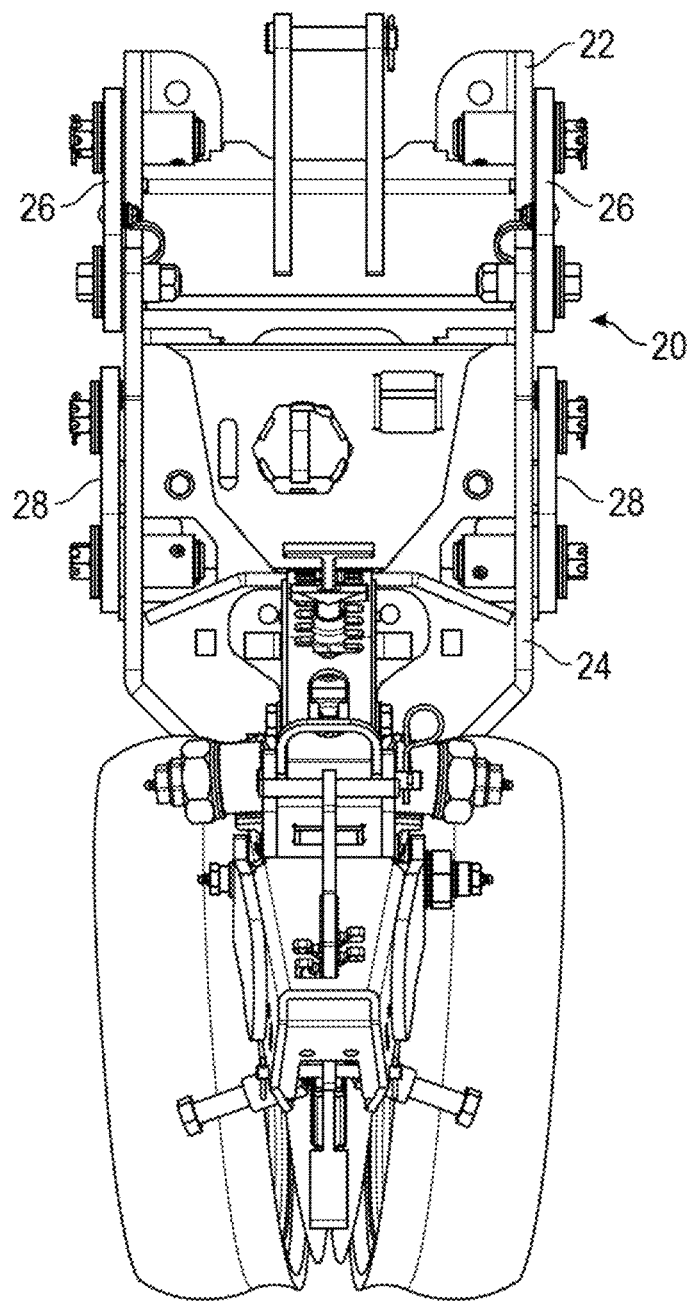
Figure 6:
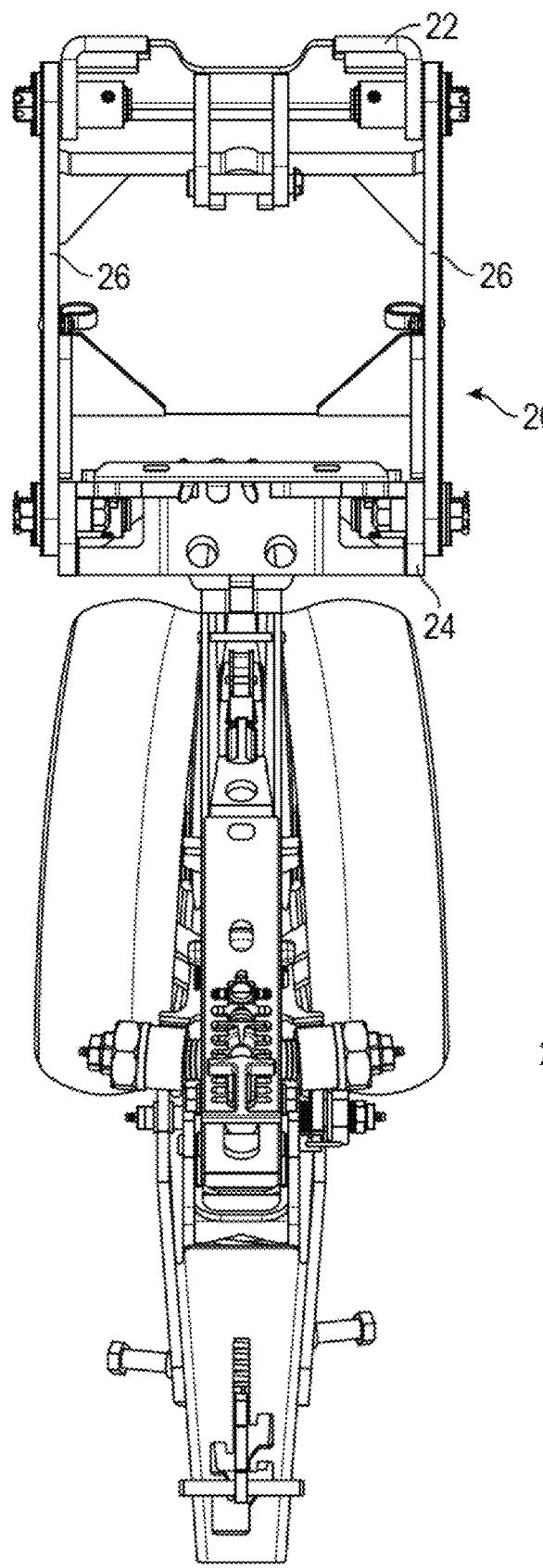
Figure 7:
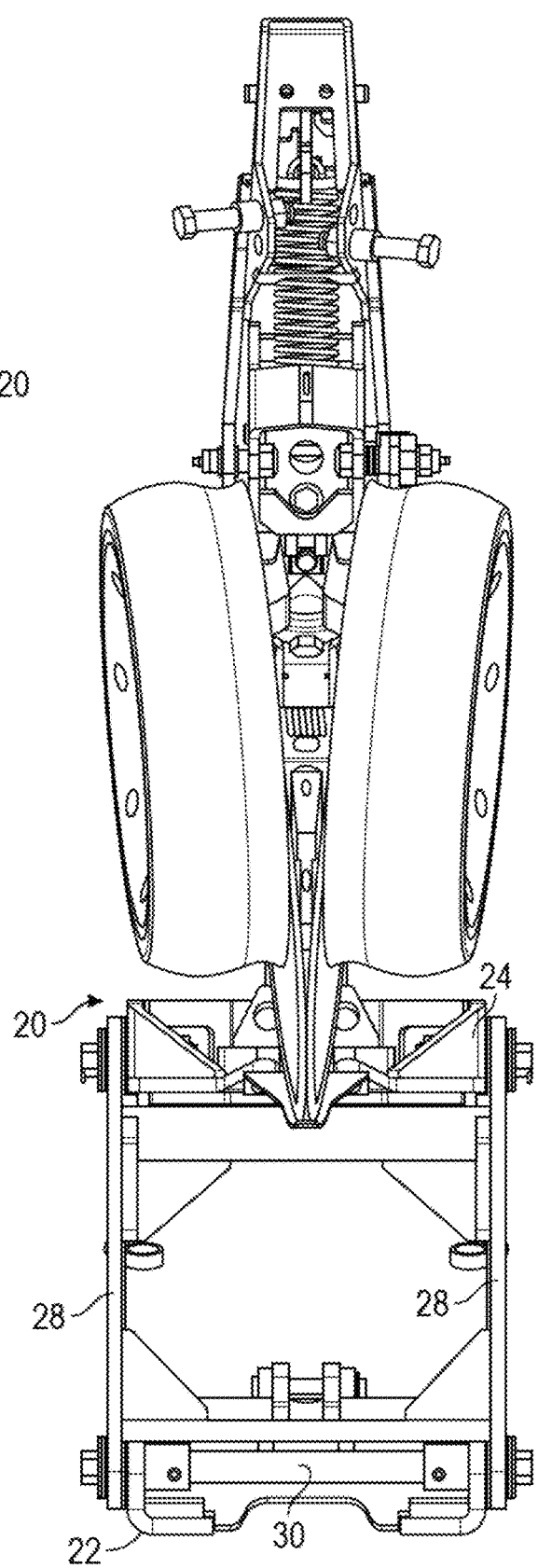

Agricultural row planters are commonly used in farming. The planter typically includes a toolbar hitched to a tractor and having a plurality of row planter units mounted to the toolbar. FIG. 1 shows the basic structure of the row unit 10, including a frame 12 for supporting opening discs 14, guide wheels 16, and closing wheels (not shown) behind the guide wheels.

The present invention is directed toward a bracket assembly 20 which mounts the frame 12 to the toolbar (not shown). The bracket assembly 20 includes a front mounting plate 22, a rear mounting plate 24, left and right upper link arms 26, and left and right lower link arms 28. In a first embodiment of the bracket assembly 20 shown in FIGS. 1-10, the front and rear mounting plates 22, 24 have a greater width than in the alternative embodiment of the bracket assembly 20A shown in FIGS. 11-17, wherein the front and rear mounting plates 22A, 24A have a narrower width.

The link arms 26, 28 each have opposite ends which are pivotally attached to the front and rear mounting plates 22, 24. The mounting plates 22, 24 or 22A, 24A and the link arms 26, 28 define upper and lower, left and right, front and rear corners for the bracket assembly's 20, 20A. Each of these 8 corners of the bracket assemblies 20, 20A eliminate the conventional bolt (typically ⅝") used in prior art row unit mounting brackets which sometimes failed due to increased draft loads caused by higher planting speeds and crop residue.

Figure 8:
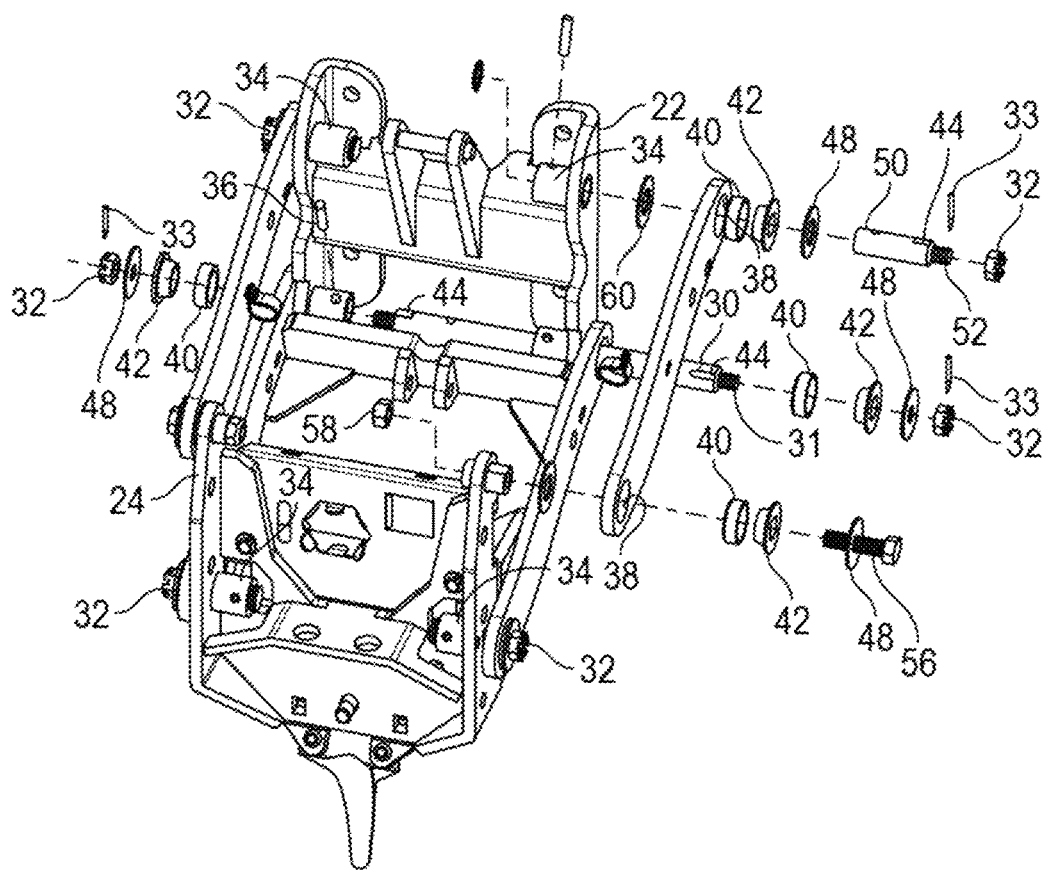

In the first embodiment bracket assembly 20, the lower front corners of the assembly formed by the connection of the front ends of the lower link arms 28 to the opposite sides of the front mounting plate 22 utilizes an elongated cross shaft 30 extending through opposite sides of the front mounting plate 22 and the forward ends of the lower link arms 28. As seen in FIG. 8, the ends of the cross shaft 30 are externally threaded so as to receive a castle nut 32. A cotter pin 33 extending through a slot in the castle nut 32 and through a hole in the end of the cross shaft 30 prevents the castle nut from vibrating off of the cross shaft 30 during transport or planting.

A bushing or collar 34 is welded on the left and right inside edges of the front mounting plate 32. The cross shaft 30 extends through the collar 34, and is pinned there to with a roll pin 36 so as to prevent rotation of the cross shaft 30.

Figure 9:
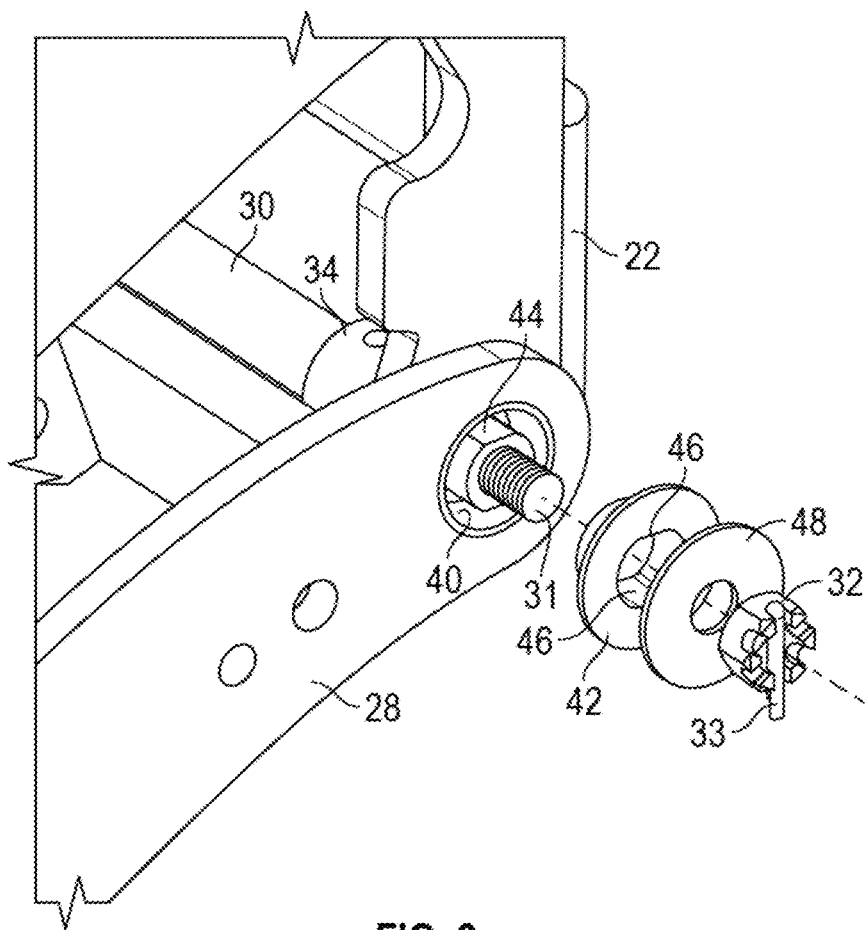
Figure 10:
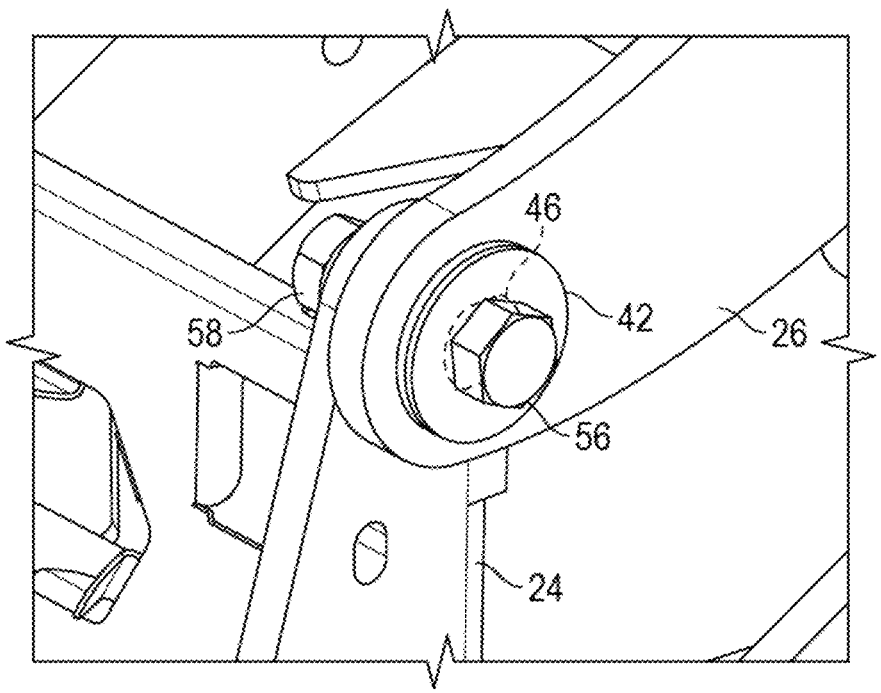
Figure 11:
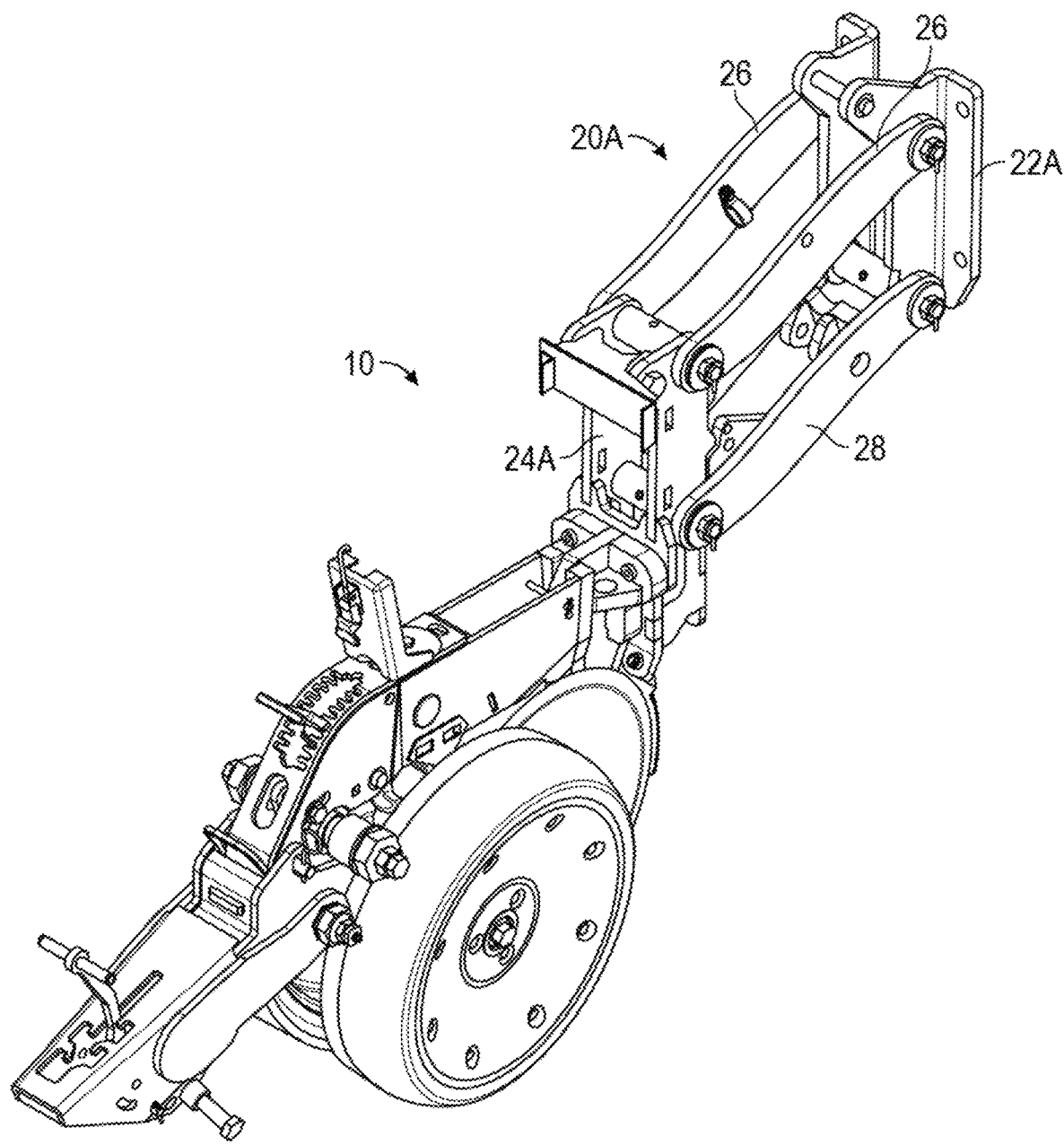
Figure 12:
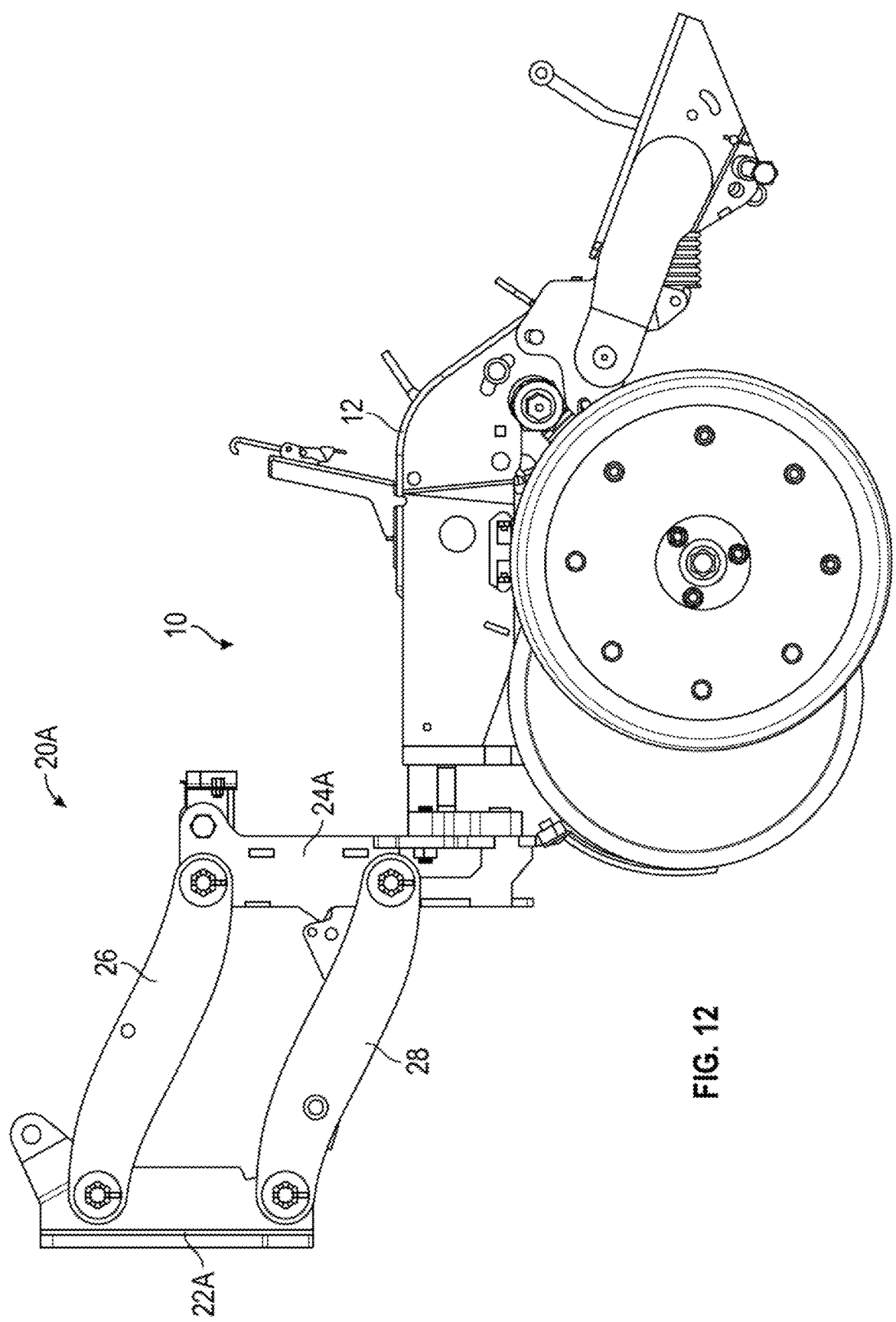
Figure 13:
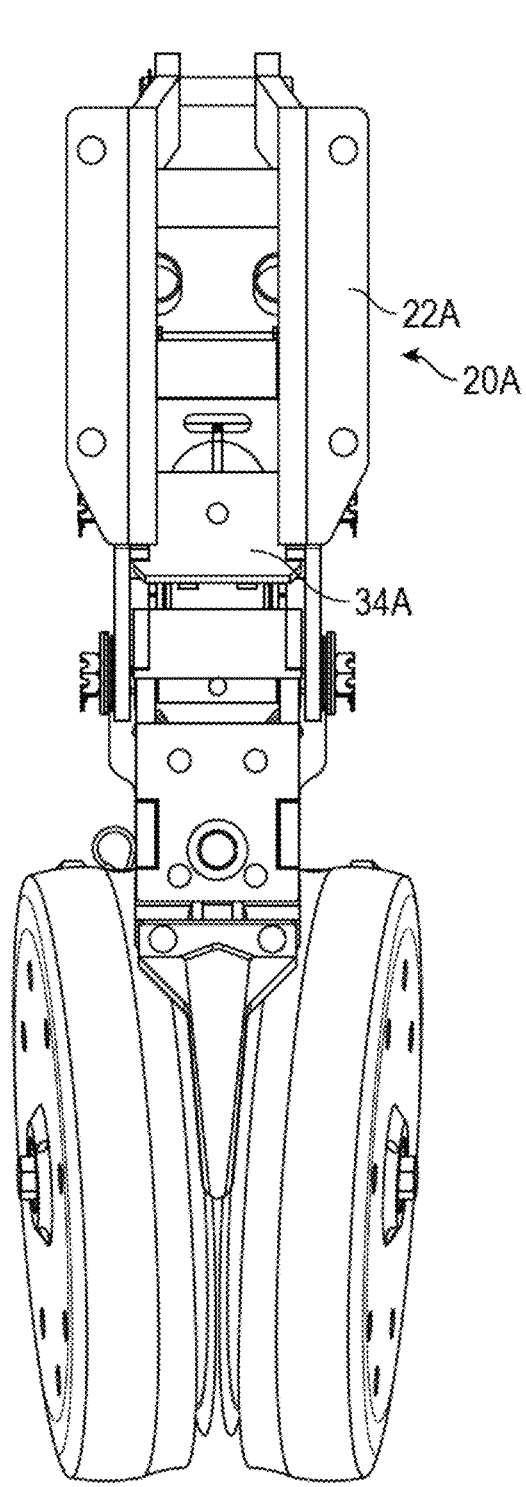
Figure 14:
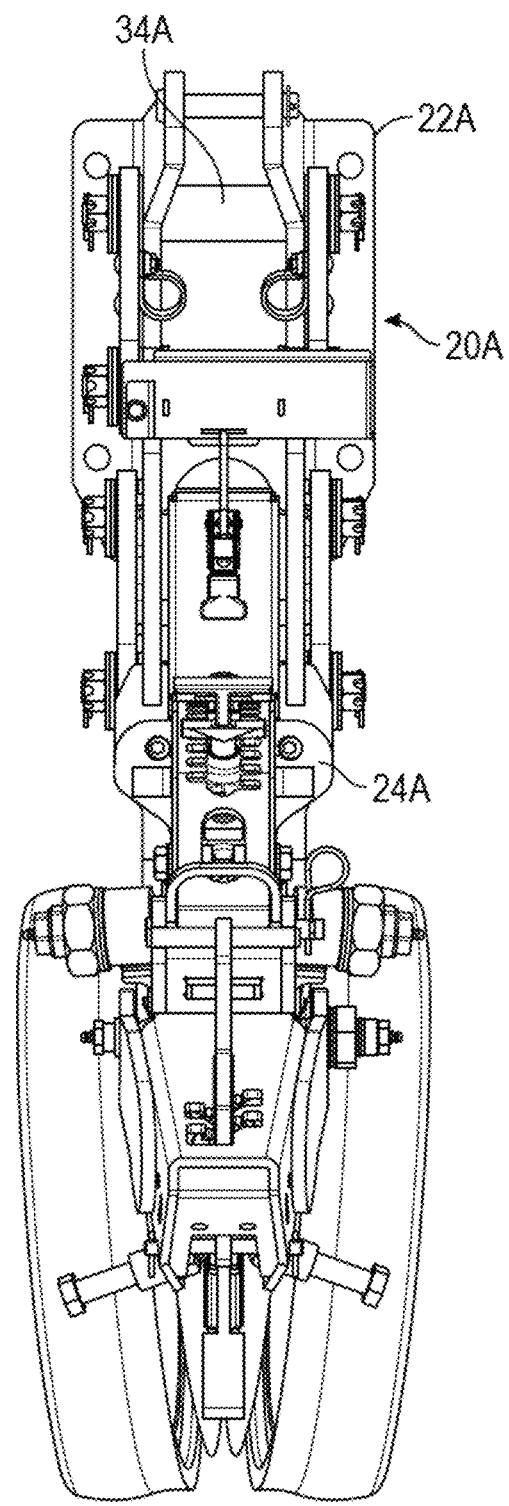
Figure 17:
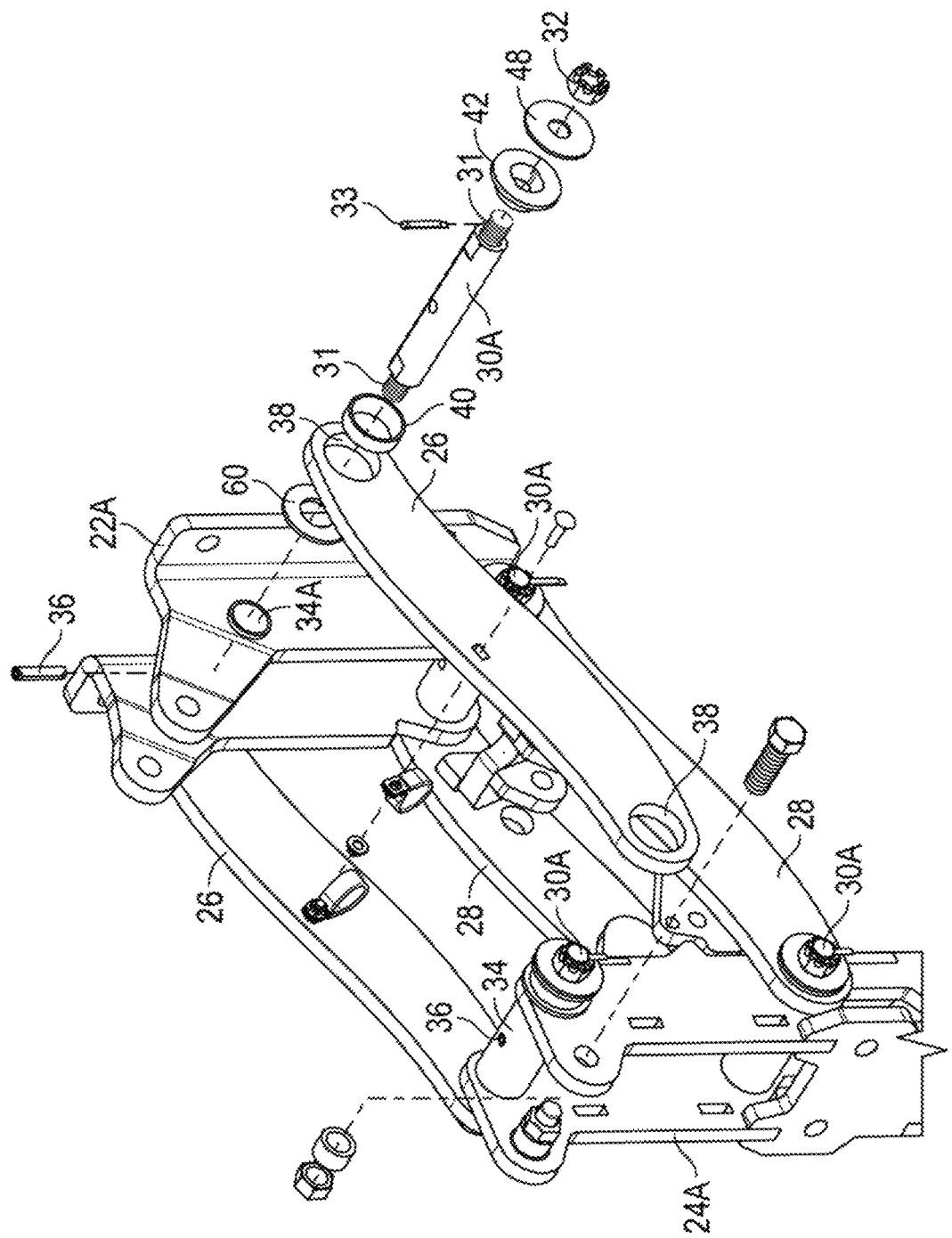

The end of the lower link arms 28 includes a hole 38 through which the cross shaft 30 extends. A tapered bearing race 40 is received in each link arm hole 38. A tapered composite bushing 42 is received within the race 40. Each end of the cross shaft 30 has at least one flat exterior surface 44 which matingly engages with at least one flat interior surface 46 on the bushing 42, thereby preventing rotation of the bushing 42 on the cross shaft 30, as best seen in FIGS. 9 and 10. A retaining washer 48 is mounted over the bushing 42, ahead of the castle nut 32.

The upper front corners and lower rear corners of the bracket assembly 20 preferably utilize the same pivot connection for the front ends of the upper link arms 26, 28 and the rear ends of the lower link arms 26, 28. More particularly, these corner or connection points use a relatively short stub spindle 50 which extends through the hole 38 in the link arm 26, 28, through holes in the opposite sides of the front and rear mounting plates 22, 24, and through collars or bushings 34 welded to the opposite inside edges of the plates 22, 24. The outer ends of the stub spindles 50 have external threads 52 to receive a castle nut 32, with the castle nut being retained by a cotter pin 33. As described above with respect to the front lower corners, the holes 38 in the front ends of the upper link arms 26 and in the rear ends of the lower link arms 28 receive a tapered bearing race 40, into which a tapered bushing 42 fits, with a retaining washer 48 between the tapered bushing 42 and the castle nut 32. The stub spindle 50 also includes at least one flat surface 44 which matingly engages with at least one flat surface 46 on the tapered bushing 42 to prevent rotation of the bushing 42 relative to the spindle 50. The spindle 50 is also fixed against rotation by a roll pin 36 extending through the collar 34 and the stub spindle 50, similar to the fixation of the cross shaft 30 described above.

The rear upper corners of the bracket assembly 20 may utilize a different pivotal connection between the rear ends of the upper link arms 26 and the rear mounting plate 24. More particularly, a stub spindle 54 extends through holes in the upper end of the rear mounting plate 24, and is welded thereto. The stub spindle 54 has internal threads adapted to receive a take-up bolt 56, which is secured by a jam nut 58. The rear ends of the upper link arms 26 also include a hole 38 in which is received a tapered bearing race 40 and the tapered bushing 42. The stub spindle 54 includes at least one flat surface 44 to matingly engage a flat surface 46 on the tapered bushing 42 to prevent rotation of the tapered bushing 42 on the stub spindle 54. A retaining washer 48 resides between the tapered bushing 42 and the head of the bolt 56.

Preferably, a low friction composite washer 60 resides between the link arms 26, 28 and the mounting plates 22, 24. One of the washers 60 is mounted on each of the cross shaft 30, the stub spindles 50, and the stub spindle 54.

The bracket assembly 20A of the second embodiment shown in FIGS. 11-17 utilizes a cross shaft 30A, preferably in each corner of the assembly, similar to that described above with respect to the bracket assembly 20 and the cross shaft 30. A collar 34A is welded to the insides of the mounting plates 22A, 24A, with each of the crossed shafts 30A extending through the corresponding collars 34A. Each end of the link arms 26, 28 of the bracket assembly 20A also utilizes the tapered bearing race 40, the tapered bushing 42, the retaining washer 48, the castle nut 32, the cotter pin 33, and the roll pin 36, as described above with respect to the back assembly 20.

The cross shafts 30, 30A and stub spindles 50, 54 preferably have an outside diameter of approximately 1 inch, which is substantially greater than the conventional ⅝-inch bolt which sometimes failed in prior art bracket assemblies due to increased draft loads.

The upper stub shafts 50, 54 are welded to the mounting plates 22, 24 to allow for mounting of the seed hopper and seed meter. These stub shafts 50, 54 and the cross shafts 30, 30A carry the draft load of the bracket assembly such that the retention bolt 56 does not have to carry any draft load, but rather only carries the pre-load of the tapered bushing 42.

The tapered races 40 and tapered bushings 42 are described in Applicant's co-pending application Ser. No. 15/451,878 filed on Mar. 7, 2017, which is incorporated herein by reference in its entirety. The races 40 and bushings 42 minimize wear during planting and minimize maintenance requirements, as described in Applicant's co-pending application.

The bottom cross shaft 30 aids in keeping the row units running true and perpendicular to the planter toolbar frame. This shaft 30 also eliminates the "flexing" of conventional bolts in the adjacent mounting plates, which can lead to fatigue and failure. The location of the shaft 30 is important due to hydraulic and pneumatic down/up force systems that are mounted to the row units. The connection point for these down force systems on the bottom parallel link arms 26, 28 is very close to the shaft pivot point. These up/down force systems not only increase the draft force on the row units, they also can add up to 600 lbs down and then change to 400 lbs up force to the gauge wheels located 24" away from this pivot point, in less the 1/10 of a second. This creates a tremendous load on the pivot shaft, especially at high planting speeds. These continuous changes happen constantly as the planter travels through the field.

On the narrow row units 20A, the cross shafts 30A add great strength to the arm assemblies due to the narrow design of the row units. These arms, mounting plates, and pivot shafts are subjected to tremendous side loading during turns or planting on contour, because they lack the width of the wider row units 20. The engineering moment around the center line of these row units 20A is considerably higher and bolts have been proven to fail under these demanding loads.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A bracket assembly for a row planter, comprising:
    front and rear mounting plates;
    left and right link arms extending between the front and rear mounting plates;
    a tapered bearing in each end of each link arm;
    a shaft extending into each tapered bearing to pivotally mount the left and right link arms to the front and rear mounting plates; and
    each tapered bearing and each shaft having flat surfaces which matingly engage to prevent rotation between the shaft and the tapered bearing.

2. The bracket assembly of claim 1 further comprising a tapered race in each end of each link arm, and the tapered bearing being rotatably mounted in the tapered race.

3. The bracket assembly of claim 2 wherein each shaft is fixed to one of the front and rear mounting plates, whereby the left and right link arms and the tapered races rotate on the tapered bearing without rotation of the tapered bearings or shafts.

4. The bracket assembly of claim 1 further comprising collars on each front and rear mounting plate, and the shaft extending through at least one of the collar.

5. The bracket assembly of claim 4 wherein the shaft is fixed to the collar surrounding the shaft.

6. The bracket assembly of claim 5 wherein the shaft is pinned to the collar.

7. The bracket assembly of claim 1 wherein the shaft extends through both the left and right link arms.

8. A method of pivotally mounting link arms onto front and rear plates of a mounting bracket of an agricultural row planter, comprising;
    extending a tapered bushing into a hole in each end of each link arm;
    extending shafts through the tapered bushings to mount the link arms onto the front and rear plates of the mounting bracket;
    the shafts and the tapered bushings having mating flats to prevent rotation of the tapered bushings on the shafts; and
    whereby the ends of the link arms are pivotal about the tapered bushings.

9. The method of claim 8 further comprising inserting a tapered race into the hole in the end of the link arm, with the tapered bushing matingly residing within the tapered race.

10. The method of claim 8 further comprising fixing the shaft to the mounting bracket to prevent rotation of the shaft relative to the mounting bracket.

11. The method of claim 8 further comprising extending the shaft through a collar on the mounting bracket.

12. The method of claim 11 further comprising pinning the shaft to the collar.

13. The method of claim 8 further comprising extending the shaft through spaced apart collars adjacent opposite lateral edges of the mounting bracket.

14. The method of claim 13 further comprising fixing the shaft to the tapered bushings.

\* \* \* \* \*